(12) United States Patent
Montrone

(10) Patent No.: US 9,223,308 B2
(45) Date of Patent: Dec. 29, 2015

(54) METHOD FOR THE COMPUTER-ASSISTED MONITORING OF THE FUNCTIONAL PERFORMANCE OF A TECHNICAL SYSTEM

(75) Inventor: Francesco Montrone, Riemerling (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 366 days.

(21) Appl. No.: 13/821,200

(22) PCT Filed: Aug. 24, 2011

(86) PCT No.: PCT/EP2011/064571
§ 371 (c)(1),
(2), (4) Date: Mar. 6, 2013

(87) PCT Pub. No.: WO2012/038179
PCT Pub. Date: Mar. 29, 2012

(65) Prior Publication Data
US 2013/0173030 A1    Jul. 4, 2013

(30) Foreign Application Priority Data
Sep. 21, 2010 (DE) .......................... 10 2010 041 149

(51) Int. Cl.
*G05B 23/02* (2006.01)
*G08B 31/00* (2006.01)

(52) U.S. Cl.
CPC ............ *G05B 23/0221* (2013.01); *G08B 31/00* (2013.01)

(58) Field of Classification Search
None
See application file for complete search history.

(56) References Cited

U.S. PATENT DOCUMENTS

| 6,057,549 | A | * | 5/2000 | Castleman | 250/339.15 |
| 7,244,939 | B2 | * | 7/2007 | Stuttard | 250/343 |
| 2003/0210139 | A1 | | 11/2003 | Brooks et al. | 340/531 |
| 2004/0249613 | A1 | * | 12/2004 | Sprogis et al. | 702/188 |

(Continued)

FOREIGN PATENT DOCUMENTS

| DE | 102004009319 A1 | 9/2005 | B21B 37/00 |
| EP | 1283455 A1 | 2/2003 | G05B 19/048 |
| WO | 2012/038179 A1 | 3/2012 | G08B 31/00 |

OTHER PUBLICATIONS

International Search Report and Written Opinion, Application No. PCT/EP2011/064571, 17 pages, Oct. 28, 2011.

*Primary Examiner* — Sean Shechtman
(74) *Attorney, Agent, or Firm* — Slayden Grubert Beard PLLC

(57) ABSTRACT

A method for computer-assisted monitoring of the functional performance of a technical system: determining an actual functional performance for each technical component of the technical system; assigning each technical component to a component type, wherein components of identical or similar functional range are assigned to one component type; determining an additional functional performance for each component type, which describes the functional range of the hardware and/or software of a component, wherein the range, among all the available components of one component type, has the highest functional performance; determining a component-related, normalized functional performance from the actual functional performance of a given technical component and from the additional functional performance; determining a component-related, normalized functional performance from the component-related, normalized functional performances of all components of the same type; comparing the component-related, normalized functional performance to a threshold value; and generating an alarm if the threshold value is not reached.

17 Claims, 3 Drawing Sheets

(56) References Cited

U.S. PATENT DOCUMENTS

| | | | |
|---|---|---|---|
| 2008/0126031 A1 | 5/2008 | Azarbayejani et al. | 703/2 |
| 2010/0242933 A1* | 9/2010 | Anilovich et al. | 123/672 |
| 2013/0173030 A1 | 7/2013 | Montrone | 700/80 |

\* cited by examiner

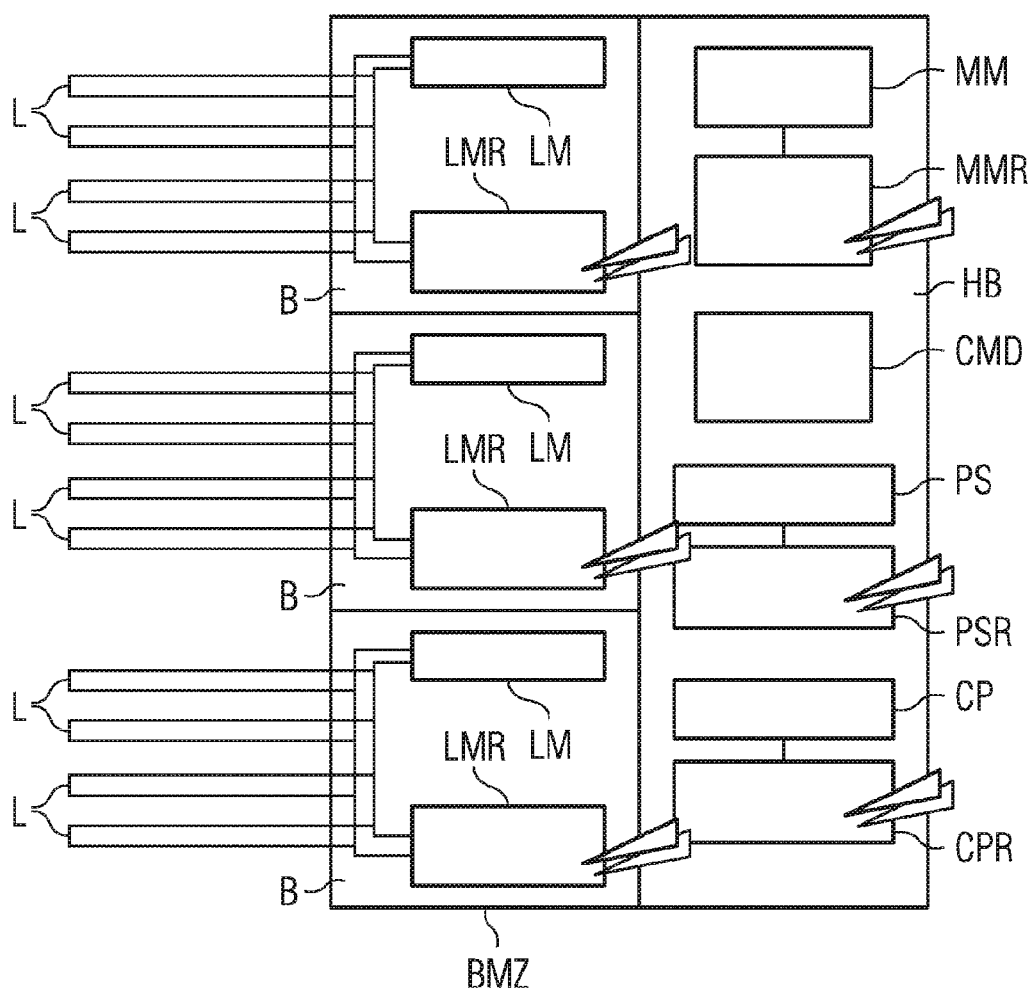

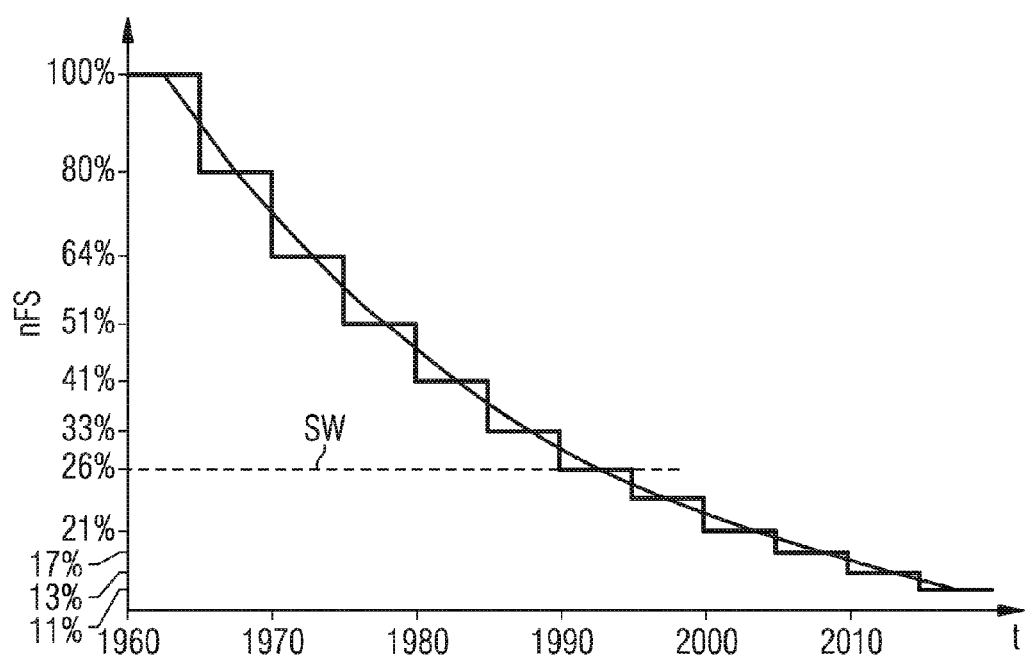

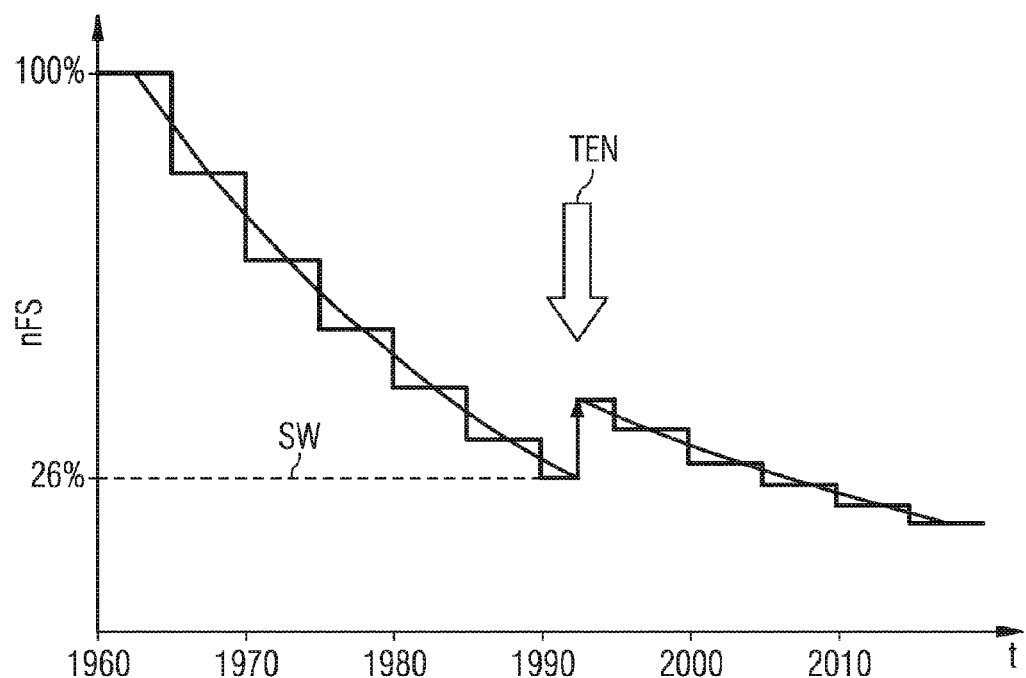

METHOD FOR THE COMPUTER-ASSISTED MONITORING OF THE FUNCTIONAL PERFORMANCE OF A TECHNICAL SYSTEM

CROSS-REFERENCE TO RELATED APPLICATIONS

This application is a U.S. National Stage Application of International Application No. PCT/EP2011/064571 filed Aug. 24, 2011, which designates the United States of America, and claims priority to DE Patent Application No. 10 2010 041 149.3 filed Sep. 21, 2010 The contents of which are hereby incorporated by reference in their entirety.

TECHNICAL FIELD

The disclosure relates to a method for the computer-assisted monitoring of the functional performance of a technical system, which comprises a plurality of technical components.

BACKGROUND

Technical systems usually comprise a plurality of the same and differing components which need to interoperate according to specification for the technical system to function. This relates for example to fire alarm systems and also to many further technical systems in other areas of application.

By way of example FIG. 1 shows a fire alarm system, representing a complex technical system. A fire alarm system typically has a number of signal lines L (known as loops), wherein each of the loops L can be connected to a predetermined, maximum number of fire alarms (not shown). A subset of signal lines is in turn connected to a line module LM, which accepts and processes the signals output by one of the fire alarms. The line module can be provided for example in a fire alarm center BMZ. For reasons of availability a redundant line module LMR is provided on the board B on which the line module LM is disposed. The redundant line module LMR is connected to the same loops L as are connected to the line module LM. A fire alarm center BMZ can comprise a plurality of boards B with respective line modules LM and redundant line modules LMR. The exemplary embodiment presents three boards B. The boards B, which are designed as printed circuit boards for example, are in their turn connected to a motherboard HB (e.g. a main circuit board). The motherboard HB includes a master module MM, which is likewise present in a redundant configuration (reference character MMR), a control module driver I/U (CMD), a power supply (PS) and a redundant power supply (PSR) as well as a control panel (CP), which is likewise present as a redundant control panel (CPR).

One of the requirements for the fire alarm system to function in accordance with specifications is that a minimum number of fire alarms are operable and an event detected by a fire alarm via the loop L is transmitted for further evaluation to the line monitor LM, which for its part sends an appropriate signal to the master module MM. The detection performance of a fire alarm can for example be dependent on the type of fire alarm. For example a fire alarm can be embodied as a smoke alarm, a heat alarm or an optical detector. The detection performance further depends on the respective hardware and/or software of the fire alarm. For example fire alarms with newer technology have an improved functional performance because of improved signal processing with new software algorithms and new hardware with more sensitive sensors and a lower rate of false alarms.

In the fire alarm system depicted by way of example in FIG. 1 not only fire alarms of different technical types but also constructionally-identical fire alarms of different functional performance or different fire alarms can be provided. A different functional performance or construction in identical fire alarms can for example be the result of replacement of defective fire alarms or of regular maintenance work, through which older and newer fire alarm types come to be used in combination. The functional performance of respective technical components of the fire alarm system is further dependent on the operational life of the system, since environmental influences, changes in the surroundings and use and also components can be subject to time-related variations.

A fire alarm system can easily be in use over several decades. Replacement of specific technical components is undertaken for example in the event of a growing accumulation of faults and failures of the respective components. Where the availability of spare parts for installed components is no longer guaranteed or the end of the product life of components is reached, there is even the compulsion to replace respective components with those of a newer design. Such replacement can also be necessary where greater demands are placed on functionality or statutory requirements change.

Over the course of time the fire alarm system described above can therefore no longer be determined in respect of the functional performance that it provides. The under some circumstances therefore it can also no longer be determined whether predetermined requirements of a statutory or other nature can be adhered to.

SUMMARY

One embodiment provides a method for the computer-assisted monitoring of the functional performance of a technical system, which comprises a plurality of technical components in which for each technical component of the technical system a current functional performance is determined, wherein the current functional performance is produced by the given hardware and/or software of the technical components; each technical component is assigned a component type, wherein components with the same or a can parable scope of functions are allocated a component type; for each component type a further functional performance is determined, which describes the range of functions of the hardware and/or software of the component, which has the highest functional performance of all available components of a component type; from the actual functional performance of a given technical component and the further functional performance a component-related, normalized functional performance is determined; from the component-related, normalized functional performances of all components of the same component type, a component type-related normalized functional performance is determined; and the component type-related, normalized functional performance of at least one component type is compared with a threshold value, wherein, if the performance falls below the threshold value an alarm signal is output.

In a further embodiment, for determining the component type-related, normalized functional performance a weighting in accordance with components of identical design relative to the total number of all components of the same component type is undertaken.

In a further embodiment, the further functional performance of a respective component type is newly defined at predetermined intervals in order to carry out the new threshold value comparison on the basis thereof.

In a further embodiment, a system-related functional performance is determined from the component type-related functional performances.

In a further embodiment, the actual functional performance and the further functional performance are characteristic values.

In a further embodiment, the further functional performance is related to the time at which the further functional performance of a component of the assigned component type is available for the first time.

In a further embodiment, the actual functional performance is determined by a comparison with at least one further functional performance of the assigned component type related to a respective time.

In a further embodiment, for each component type, information in a database about the beginning and the end of its market availability, its functional performance, its functional performance compared to a previous generation in time, compatibility with other components of the same or of a different component type is evaluated or is stored in said database.

Another embodiment provides a use of the disclosed method to determine the functional performance in a fire alarm system.

Another embodiment provides a computer program product stored in a non-transitory computer readable medium, e.g., loaded into the internal memory of a digital computer, and comprising software code executable by a processor to perform any of the methods disclosed herein.

BRIEF DESCRIPTION OF THE DRAWINGS

Exemplary embodiments will be explained in more detail below based on the schematic drawings, wherein:

FIG. 1 shows an already described, exemplary schematic diagram of a complex technical system with a plurality of different components, FIG. 2 shows a diagram representing the normalized functional performance of a component type over the course of time, wherein no renewals or no replacement of technical components of the technical system take place over time, FIG. 3 shows a diagram which illustrates the normalized functional performance over the course of time with a part renewal of components of the technical system, and FIG. 4 shows an example table with information for respective components used in a technical system.

DETAILED DESCRIPTION

Embodiments of the present disclosure provide a method with which computer-assisted monitoring of the functional performance of a technical system which has a plurality of technical components is guaranteed.

For example, some embodiments provide a method for computer-assisted monitoring of the functional performance of the technical system which comprises a plurality of technical components, an actual functional performance is first determined for each technical component of the technical system, wherein the actual functional performance is produced from the given hardware and/or software of the technical components. The actual functional performance is produced for example from the speed of signal processing, the detection rate of sensor signals etc. The actual functional performance can for example be specified in the form of a characteristic value, wherein said value is then designed to express a comparison between technical components with different functional performance.

Furthermore each technical component is assigned a component type, wherein components with the same or a comparable range of functions are allocated one component type. In the example of a fire alarm system described at the start component types represent "fire alarms", "loops", "line modules", "master modules", "controllers", "control and monitoring units" as well as "power supplies". The classification of the component types can be selected to be as fine as required in respect of granularity. A component type can for example combine different component subtypes. For example fire alarms which operate according to the principle of optical detection, smoke detection or heat detection represent different component subtypes which are combined into one component type "fire alarms". This type of subdivision can also be carried out to any given granularity.

In a further step a further functional performance is determined for each component type, which describes the range of functions of the hardware and/or software of a component which has the highest functional performance of all available components of a component type. The further functional performance can thus be considered as the "prior art" functional performance. The further functional performance is provided by such components as have the highest possible currently available performance capability.

In a further step a component-related, normalized functional performance is determined from the actual functional performance of the respective technical component and the further functional performance. By means of the component-related normalized functional performance it is possible to compare components of the same component type in respect of their functional performance.

Subsequently a component type-related normalized functional performance is determined from the component-related normalized functional performances of all components of the same component type. This makes possible a quantitative assessment of the functional performance of all components of the same component type.

In the last step the component type-related, normalized functional performance of at least one component type is compared with a threshold value, wherein an alarm signal is generated if the threshold value is not reached. The alarm signal signals an inadequate functional performance and the necessary replacement of at least some of the components of the at least one component type.

The method can be used to quantitatively assess different effects of different maintenance and modernization measures. In particular a normalized functional performance of the technical system can be represented over the course of time. This can be used for historical evaluations and also for planning and undertaking migration of individual components or a number of components of the technical system. In particular it makes possible the process of comparing strategies with one another and carrying out optimizations in respect of maximizing a minimum functional performance which can be assumed at any given point in time. A further optimization can include defining a Pareto front for the functional performance and optionally the costs of part renewals of the system. A further aspect includes optimizing the costs, under the condition that the system does not have a functional performance at any point which is too low.

In one embodiment, for determining the component-type-related, normalized functional performance, a weighting in accordance with identically constructed components relative to all components of the same component type is carried out. This makes it possible in a simple manner to take account of the number of respective component subtypes.

In a further embodiment the further functional performance of a respective component type is merely defined at predetermined intervals in order, on the basis thereof, to carry out the threshold value comparisons again. The time interval can be of a regular nature. The time interval can however also be selected as a function of the intervals between two component generations in each case.

In a further embodiment a system-related functional performance is determined from the component type-related functional performances, which makes possible a quantitative assessment of the overall technical system. For this a weighted arithmetic, geometrical or harmonic mean value or also the product can be formed with the normalized component type-related functional performances, depending on how the functional performance of the technical system is made up from the functional performances of the component types. With the product it is important for the system functional performance that all component types produce their functional performance, with a mean value formation the function contribution already leads to an increase of the system functional performance independently of functional performances of other component types.

In a further embodiment the actual functional performance and the further functional performance are characteristic values. The actual functional performance can deteriorate by degradation, contamination, shifting of component values. The characteristic value of the further functional performance of the component is dependent on its technical development and the range of performance. In other words this means that each new generation of a component has a higher performance scope and therefore a higher functional performance, which is reflected for example in an appropriately higher characteristic value. The characteristic values of actual and further functional performance, when directly compared with one another, make it possible to compare older and prior-art components. Since, for determining the normalized functional performance, the actual functional performance and the further functional performance are related to one another, the normalized functional performance of an older component falls ever further over time, especially as a result of the characteristic value of the further functional performance which is becoming ever higher.

The further functional performance may be related to a time at which the further functional performance of a component of the assigned component type is available for the first time.

In a further embodiment the actual functional performance is determined by a comparison with at least one further functional performance of the assigned component type related to a respective time. This means in other words that, for the determination of the actual functional performance of older components, the functional performance of the current component(s) is first determined as a reference. Based on the functional performance of the current component(s) the functional performance of the component(s) of the last generation is then determined. Based on this as a new reference, the functional performance of the previous generation is determined, etc. The result of this is that, with each new generation, a deterioration of the normalized functional performance of the older component(s) will occur. In such cases the set, predetermined threshold value will then eventually be reached at some point, which is necessary for maintaining the functionality according to specification of the technical system. At this point in time at the latest it is necessary to replace individual components of a component type all components of a component type in order to keep the overall normalized functional performance above the predetermined threshold value.

In a further embodiment, for each component type in a database, information may be evaluated about the beginning and the end of its availability on the market, its functional performance, its functional performance in relation to a previous generation, its compatibility with other components of the same or of another component type and stored in this database. If the said information is available for the components used in a technical system, then it is possible in a simple manner to determine the normalized functional performance of at least one component type and to carry out the described threshold value comparison to assess the system.

The disclosed method can for example be used for determining the functional performance in a fire alarm system. The method makes it possible however to also quantitatively determine the functional performance of any other given technical systems which are based on a plurality of different components.

Other embodiments provide a computer program product which can be loaded directly into the tangible memory of a digital computer and which comprises the software code segments with which the steps of the described method are executed when the product is running on a computer.

The description given below is based on the fire alarm system BMA already described in conjunction with FIG. 1, which merely represents any given technical system.

FIG. 2 shows the normalized functional performance nFS valid for a fire alarm system BMA over the course of time T. The normalized functional performance nFS relates to all components of the same component type of the fire alarm system. For example the normalized functional performance relates to all fire alarms installed in the fire alarm system BMA. The qualitative graph would therefore also be similar for other component types such as line modules, master modules etc. The result of this is that, even with a representation of the normalized functional performance for the entire technical system of the fire alarm BMA a qualitatively similar graph would be produced over time. The restriction to an individual component type selected in the description serves merely to facilitate understanding.

The determination of the normalized functional performance for all fire alarms of the fire alarm system BMA, which are connected to all loops L, is based on the determination of an actual functional performance for each technical component, i.e. each fire alarm of the fire alarm system. For simplification it is sufficient for the actual functional performance of each different component type to be determined. Subtypes of fire alarms are for example those that are based on different technical protection principles. For the said simplification in this case it is assumed that the actual functional performance of each heat detector of the same design is identical. Were the actual functional performances of heat detectors, optical detectors and smoke detectors (as component subtypes) to be determined, then all information necessary for further calculations would be available.

It is expedient in this case if, for a respective component subtype, the information determined is stored in a table of a database for future calculations of the functional performance. A typical table of such a database is shown in FIG. 4, which for example comprises the columns KOMP for the observed components, DAT for the date of market entry, LEISTPL for the performance plus compared to a previous generation of components with a similar function, the price PR and a service life LD. The service life LD in this case refers to the period of availability between beginning of availability on the market and end of availability on the market. If necessary further columns can be provided which specify the period of a possible provision of spare parts.

The actual functional performance F1 is produced from the technical capabilities and options of the respective components. In particular hardware and/or software of the technical components specify the actual functional performance in respect of speed of signal processing and detection rate of sensor signals, etc.

A further functional performance F2 is determined for each component type, wherein the further functional performance specifies the range of functions of a prior-art component of the same component type or subtype. Such a prior-art component thus exhibits the highest functional performance of all components of a specific component type.

From the actual functional performance F1 of the respective technical component (or of a component subtype) and the further functional performance F2 of a prior-art component (or of a prior-art component subtype) a component-related normalized functional performance nF is determined. This is done, as explained, at least for all component subtypes of the respective component type, in the concrete exemplary embodiment the normalized functional performances nF are determined in each case for optical detectors, smoke detectors and heat detectors.

In order to determine a normalized functional performance nFS related to a component type fire alarm, a weighting in accordance with components of a similar construction relative to the total number of all components of the same component type is undertaken. This is done in accordance with the following formula:

$$nFS(\text{all alarms}) = \sum_{i=Alarmtype1}^{AlarmtypeN} w_i \cdot nF(\text{Alarm } type_i), \text{ wherein}$$

$$w_i = \frac{\text{Number of alarms of type } i \text{ which are installed in the system}}{\text{Total number of alarms}}$$

Alarm $type_i$ corresponds to the component subgroup types given above. The result is a quantitative evaluation in the form of the normalized functional performance nFS in relation to all fire alarms of a fire alarm system.

This procedure is repeated in a similar way for all component types.

The component-related normalized functional performance nF may be determined on the basis of the actual functional performance F1 of a current component (which then corresponds to the further functional performance F2), in order to be able to determine the actual functional performance F1 of older components in relation hereto. The actual functional performance F1 determined for a component of a given appearance date remains constant in this case over its entire period of use, regardless of which improvements new generations have experienced. Improvements only make themselves evident in the further functional performance to which the actual functional performance F1 is related. This produces the functional performance shown in FIG. 2, in a roughly exponentially falling curve of the normalized functional performance.

A fire alarm representing the prior art in the year 1960 has a normalized functional performance of 100% until the appearance of the next generation. For the sake of simplicity it is assumed in the diagram depicted in FIG. 2 that a new product generation which has a 20% higher functional performance appears every five years. The result of this is that the normalized functional performance of the fire alarm installed in the year 1960 only amounts to 80% in the year 1965. With the appearance of the next generation in the year 1970 the normalized functional performance of all fire alarms once again reduces by 20% and only amounts to 64%. In the year 2010 the normalized functional performance nFS, with the appearance of the 10th successor generation, now only amounts to 11%.

As a result of the service life, the environmental stress acting on the fire alarm, changes in the surroundings and use as well as shifting of component values, even if the fire alarm installed in 1960 has been continuously repaired, its functional capability measured against statutory requirements as well as other general conditions, can no longer be ensured. Even by the year 1990 the performance falls below a selected threshold value, which lies for example at 26% of the normalized functional performance nFs, so that there is a need for action in relation to the renewal of at least one of a number of fire alarms. The fact that the normalized functional performance nFS has fallen below the threshold value SW triggers an alarm signal for example. The threshold value SW can comply with a statutory requirement or also be technically related.

If a part renewal of the fire alarm takes place by a part of the fire alarm being replaced by a part with higher functional performance, the normalized functional performance nFS increases so that the threshold value SW is once again exceeded. This is shown for purposes of illustration in FIG. 3, where TEN represents the time of the part renewal. For a replacement of all fire alarms by fire alarms with the highest functional performance in accordance with the prior art a normalized functional performance nFS of 100% could again be reached.

The normalized functional performance of a component type or in the expansion of the overall technical system allows the functional integrity of the technical system to be safeguarded over the course of time. It is to be ensured in this case that the normalized functional performance does not fall below a specific threshold. The quantitative determination of the normalized functional performance makes possible a historical assessment as well as automated information as to when there is a need for action in relation to the renewal of components. In this case the determination of the normalized functional performance of the component types of the entire technical system allows costs to be minimized in respect of replacement of individual components, with the proviso that the technical system does not have a functional performance that is too low. In addition the minimum functional performance can be maximized, which can be undertaken at any given point in time. For example the Pareto front for the normalized functional performance and the costs of part renewals of the technical system can be determined.

What is claimed is:

1. A method for the computer-assisted monitoring of the functional performance of a technical system having a plurality of technical components, the method comprising:
  using a processor to execute computer instructions to:
    for each technical component of the technical system, determine an actual functional performance based on given hardware and/or software details of the technical components;
    assign each technical component a component type, wherein components with the same scope of functions are assigned to a component type;
    for each component type, determine a further functional performance that describes a range of functions of the hardware and/or software of the component, which has the highest functional performance of all available components of a component type;

for each technical component, determine a normalized functional performance based on the actual functional performance and the further functional performance determined for that technical component type;

for each component type, determine a component type-related normalized functional performance based on the component-related, normalized functional performances determined for all functional components of that component type, including taking into consideration generation data of each component type; and for at least one component type, compare the component type-related, normalized functional performance determined for that component type with a threshold value, and, in response to determining that the component type-related, normalized functional performance is below the threshold value, automatically generate an alarm signal.

2. The method of claim 1, wherein, for determining the component type-related, normalized functional performance for a particular component type, a weighting is performed in accordance with components of identical design relative to the total number of all components of the particular component.

3. The method of claim 1, wherein the further functional performance of a respective component type is newly defined at predetermined intervals in order to carry out one or more new threshold value comparisons on the basis thereof.

4. The method of claim 1, wherein a system-related functional performance is determined from the component type-related functional performances.

5. The method of claim 1, wherein the actual functional performance and the further functional performance are characteristic values.

6. The method of claim 1, wherein the further functional performance is related to a time at which the further functional performance of a component of the assigned component type is available for a first time.

7. The method of claim 1, wherein the actual functional performance is determined by a comparison with at least one further functional performance of the assigned component type related to a respective time.

8. The method of claim 1, comprising evaluating or storing in a database, for each component type, information regarding a beginning and an end of market availability, a functional performance, a functional performance compared to a previous generation in time, and a compatibility with other components of another component type.

9. The method of claim 1, wherein the method is executed to determine the functional performance of a fire alarm system.

10. A computer program product for the computer-assisted monitoring of the functional performance of a technical system having a plurality of technical components, the computer program product comprising computer instructions stored in non-transitory computer readable media and executable by a processor to:

for each technical component of the technical system, determine an actual functional performance based on given hardware and/or software details of the technical components;

assign each technical component a component type, wherein components with the same scope of functions are assigned to a component type;

for each component type, determine a further functional performance that describes a range of functions of the hardware and/or software of the component, which has the highest functional performance of all available components of a component type;

for each technical component, determine a normalized functional performance based on the actual functional performance and the further functional performance determined for that technical component type;

for each component type, determine a component type-related normalized functional performance based on the component-related, normalized functional performances determined for all functional components of that component type, including taking into consideration generation data of each component type; and for at least one component type, compare the component type-related, normalized functional performance determined for that component type with a threshold value, and, in response to determining that the component type-related, normalized functional performance is below the threshold value, automatically generate an alarm signal.

11. The computer program product of claim 10, wherein, for determining the component type-related, normalized functional performance for a particular component type, a weighting is performed in accordance with components of identical design relative to the total number of all components of the particular component.

12. The computer program product of claim 10, wherein the further functional performance of a respective component type is newly defined at predetermined intervals in order to carry out one or more new threshold value comparisons on the basis thereof.

13. The computer program product of claim 10, wherein a system-related functional performance is determined from the component type-related functional performances.

14. The computer program product of claim 10, wherein the actual functional performance and the further functional performance are characteristic values.

15. The computer program product of claim 10, wherein the further functional performance is related to a time at which the further functional performance of a component of the assigned component type is available for a first time.

16. The computer program product of claim 10, wherein the actual functional performance is determined by a comparison with at least one further functional performance of the assigned component type related to a respective time.

17. The computer program product of claim 10, configured to evaluate or store in a database, for each component type, information regarding a beginning and an end of market availability, a functional performance, a functional performance compared to a previous generation in time, and a compatibility with other components of another component type.

* * * * *